United States Patent [19]

Iwata et al.

[11] Patent Number: 4,557,618
[45] Date of Patent: Dec. 10, 1985

[54] INK AND ERASER OF THE INK

[75] Inventors: Masahiro Iwata; Yushi Miyashita, both of Koshigaya; Yuichi Taka, Soka, all of Japan

[73] Assignee: Pentel Kabushiki Kaisha, Tokyo, Japan

[21] Appl. No.: 452,050

[22] Filed: Dec. 22, 1982

[30] Foreign Application Priority Data

| Dec. 25, 1981 | [JP] | Japan | 56-212257 |
| Jan. 28, 1982 | [JP] | Japan | 57-11999 |
| Apr. 19, 1982 | [JP] | Japan | 57-56625[U] |
| Apr. 19, 1982 | [JP] | Japan | 57-56626[U] |
| Apr. 30, 1982 | [JP] | Japan | 57-63736[U] |
| Apr. 30, 1982 | [JP] | Japan | 57-63737[U] |
| May 28, 1982 | [JP] | Japan | 57-91106 |
| Jun. 11, 1982 | [JP] | Japan | 57-100050 |
| Nov. 10, 1982 | [JP] | Japan | 57-197404 |
| Nov. 26, 1982 | [JP] | Japan | 57-207372 |
| Dec. 1, 1982 | [JP] | Japan | 57-211083 |

[51] Int. Cl.$^4$ .................. B43K 27/12; B43K 7/00
[52] U.S. Cl. .................. 401/34; 401/21; 401/17; 401/18; 401/19; 401/23; 252/89.1; 252/94; 106/20
[58] Field of Search .......... 15/3.53, 104.93, 104.99, 15/105.51, 424; 106/19-23, 32; 401/17-19, 21, 23, 34; 252/89.1, 94, 103, 156, 158

[56] References Cited

U.S. PATENT DOCUMENTS

| 1,153,807 | 9/1915 | MacPherson | 401/34 |
| 2,046,022 | 6/1936 | Hughes | 401/18 |
| 2,393,111 | 1/1946 | Lehman | 401/17 |
| 2,571,620 | 10/1951 | Sala | 401/34 |
| 3,691,270 | 9/1972 | Charle et al. | 15/104.93 |
| 4,228,028 | 10/1980 | Lin | 106/22 |

FOREIGN PATENT DOCUMENTS

| 2035353 | 3/1979 | Fed. Rep. of Germany | 401/23 |
| 982772 | 6/1951 | France | 401/34 |

OTHER PUBLICATIONS

Wolfe; *Printing & Litho Inks* (Book); 1967; MacNair—Dorland Co.; p. 372.
Chem. Abst. 77-36347x; 1972; p. 105; vol. 77, Gronowska et al.
Chem. Abst.; 91-93197m; 1979; p. 91; vol. 91, Iwata et al.

*Primary Examiner*—Richard J. Apley
*Assistant Examiner*—Gregory Beaucage
*Attorney, Agent, or Firm*—Wenderoth, Lind & Ponack

[57] ABSTRACT

Colored ink comprising a developer having a phenolic hydroxyl group, an electron-donating colorless dye which develops a color by the action of the developer, and a solvent which does not inhibit a color developing reaction. Handwriting written in this colored ink can be erased by using an eraser comprising a desensitizing compound which makes the colored electron-donating dye colorless.

22 Claims, 9 Drawing Figures

INK AND ERASER OF THE INK

BACKGROUND OF THE INVENTION

The present invention relates to a novel method for writing and erasing. More particularly, the present invention relates to a colorless dye/developer system ink which can give deep, clear handwriting, and to an eraser which can easily erase the handwriting written in the ink. Further, the present invention relates to a combination of a writing utensil employing an ink and an erasing utensil employing the eraser.

Heretofore, there have been developed various methods for erasing handwriting written in ink. For example, there is a method (1) in which handwriting written in ink employing an easily bleachable dye is erased by means of a bleaching agent, and a method (2) in which a colorant is incorporated in a rubbery high-molecular weight material, the resulting material is dissolved in a solvent to produce ink, and handwriting written in this ink is erased by a rubber eraser. However, these methods have the following disadvantages. In method (1), traces of erased ink marks are liable to yellow and the stability of the bleaching agent with time is poor. In method (2), since the viscosity of the ink is highly increased, the use of a pressurized ball point pen structure becomes necessary and, further, the erasing performance is not thought to be fully satisfactory.

Heretofore, there has been proposed a writing method utilizing a reversible reaction in which color development is caused by electron transfer between a developer having a phenolic hydroxyl group and a colorless electron-donating organic compound (a colorless dye) which develops a color by the action of said developer, and this color development caused by the electron transfer is inhibited by a desensitizer consisting of a polar compound, whereby the colored dye is made colorless. For example, there is disclosed in Japanese patent publication No. 21649/1973 a writing material consisting of a dye (a colorless dye) having a developing component structure in the molecule, a compound (a developer) having an acidic hydroxyl group in the molecule and a polar solvent (a desensitizer). This writing material is intended to provide a special-purpose ink which is colorless just before writing and which gives visible handwriting by evaporation of the polar solvent after writing. Since the handwriting can not be recognized at the time it is written, this writing material is unsuitable as ink for usual writing utensils. Further, there is disclosed in Japanese patent publication No. 48085/1976 a colorant for writing utensils, which consists of an electron-donating organic compound (a colorless dye), a compound having a phenolic hydroxyl group (a developer) and a nonvolatile compound (a desensitizer) desensitizing a color developing reaction between said two compounds. Handwriting written in such a colorant is colored immediately after it is written. However, when the developer in said handwriting is evaporated by heating or washed off by water, the handwriting is made colorless or discolored. Such an erasing technique is not simple as compared with means employing a rubber eraser or an erasing liquid. Thus, this colorant is unsuitable for use as erasable ink for usual writing utensils. Further, there can not be obtained stable fast handwriting which does not suffer discoloration nor decoloration with time as in the usual ink.

SUMMARY OF THE INVENTION

An object of the present invention is to provide a novel method for writing and erasing in which handwriting which is denser and clearer than that written with pencils can be obtained and this handwriting can be easily erased as the occasion demands.

Another object of the present invention is to provide ink capable of giving stable and fast handwriting which does not suffer discoloration nor decoloration with time as in handwriting written in usual ink, and to provide an eraser which can erase easily and completely the handwriting written in said ink.

A still another object of the present invention is to provide a combination of a writing utensil which enables clear handwriting to be written in ink, and an erasing utensil which can easily and completely erase said handwriting as the occasion demands.

We have now found that when writing is performed by using colored ink comprising a developer having a phenolic hydroxyl group and an electron-donating colorless dye capable of developing a color by the action of said developer dissolved in a solvent which does not inhibit a color developing reaction between said developer and said colorless dye, dense and clear handwriting similar to that written in usual ink can be obtained; this handwriting has no fear of discoloration nor decoloration with time due to a desensitizer because this ink does not contain any desensitizing polar compounds, that is, desensitizers which makes the developed dye colorless; and the handwriting written in this ink can be easily and completely erased by an eraser comprising a desensitizing polar compound.

According to one aspect of the present invention, there is provided a method for writing and erasing including writing in colored ink comprising a developer having a phenolic hydroxyl group, an electron-donating colorless dye capable of developing a color by the action of said developer and a solvent which does not inhibit a color developing reaction between said developer and said colorless dye, and then erasing handwriting written in said colored ink by means of an eraser comprising a desensitizing polar compound which makes said colored electron-donating dye colorless.

According to another aspect of the present invention, there is provided a combination of ink and an eraser for this ink. Said ink is a colorless dye/developer system ink comprising a developer having a phenolic hydroxyl group, an electron-donating colorless dye capable of developing a color by the action of said developer and a solvent which does not inhibit a color developing reaction between said developer and said colorless dye. In order to obtain stable and fast handwriting which does not suffer discoloration nor decoloration when exposed to external conditions such as heat, light, water, etc. particularly after writing, it is preferred to use a novolak type phenolic resin as said developer and an aromatic alcohol and/or ethylene glycol monophenyl ether as said solvent. Said eraser for ink comprises a desensitizing polar compound, that is, a desensitizer which makes colored ink colorless. A liquid polar compound can be used as a desensitizer. However, in order to inhibit erased handwriting to reappear and to enable erased surfaces to be re-written in the same ink immediately after erasing, it is preferred to use, as an eraser, a solution of a low-volatile desensitizing polar compound dissolved in a volatile solvent having a boiling point of not higher than 160° C., said polar compound being a solid at an ordinary temperature and having a melting point of 60° C. or higher, but a vapor pressure of 1 mmHg or lower at 150° C.

According to still another aspect of the present invention, there is provided a set of a writing utensil and an erasing utensil. Said writing utensil is composed of a first barrel, an ink reservoir provided within said first barrel, an ink passage member for supplying ink from said ink reservoir to the tip of said first barrel and a writing nib provided at the tip of said ink passage member. Said ink is a colored ink comprising a developer having a phenolic hydroxyl group, an electron-donating colorless dye capable of developing a color by the action of said developer and a solvent which does not inhibit a color developing reaction between said developer and said colorless dye. Said erasing utensil is composed of a second barrel, an erasing liquid reservoir provided within said second barrel, a porous passage member for supplying an erasing liquid from said erasing liquid reservoir to the tip of said second barrel, and an erasing liquid coating part which is formed by protruding said porous passage member from the tip of the second barrel. Said erasing liquid comprises a desensitizing polar compound which makes said colored ink colorless.

Said writing utensil may be in the form of a marking pen type writing utensil. Said ink passage member may be constructed of a felt or fibrous wick member, and said writing nib may be formed by protruding said nib from the tip of the first barrel.

Alternatively, said writing utensil may be in the form of a ball point pen type writing utensil. Said ink passage member may be constructed of a socket member provided with a through-hole, and said writing nib may be constructed of a writing ball rotatably housed in and partly protruding from the socket.

The barrel of the writing utensil and the barrel of the erasing utensil may be constructed as separate barrels, but may be constructed as one barrel which is divided into two compartments by a divider. In such a case, within one compartment of the barrel there is provided the ink reservoir, and within the other compartment of the barrel there is provided the erasing liquid reservoir.

Said erasing utensil may be a solid molded article prepared by uniformly dispersing microcapsules in a solidifying agent matrix, solidifying the dispersion and molding it. In said microcapsules, an erasing liquid is enclosed as a core material, said erasing liquid containing a desensitizing polar compound which makes said colored ink colorless.

These and other objects of the present invention will become apparent from a further and more detailed description of the invention as follows.

DETAILED DESCRIPTION OF THE INVENTION

Figure 1:
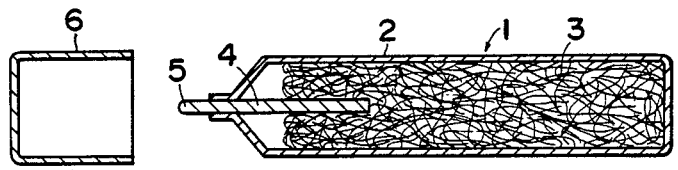
FIG. 1 is a sectional view showing one embodiment of a marking pen type writing utensil constituting a combination of a writing utensil and an erasing utensil of the present invention.

Writing ink which is used in the present invention can be prepared by dissolving a developer having a phenolic hydroxyl group and an electron-donating organic compound (hereinafter referred to as colorless dye) capable of developing a color by the action of said developer in a solvent which does not inhibit a color developing reaction between said developer and said colorless dye.

The so-prepared colorless dye/developer system ink contains a dye developed by the action of the developer, and is densely colored as in usual oily ink. Thus, dense and clear handwriting can be obtained. Further, the handwriting has no fear of discoloration nor decoloration with time due to a densensitizer because this ink does not contain any polar compounds, i.e., any desensitizer which make the colored dye colorless.

The phenolic hydroxyl group-containing developer should be those which are sufficiently nonvolatile (preferably those having a boiling point of 320° C. or higher) to such an extent that handwriting is not discolored with time and which have solubility in a solvent suitable for ink preparation. Any of these materials can be used without particular limitation. As examples of the developers suitable for the present invention, there may be mentioned p-nonylphenol, 2,2'-methylene-bis-p-nonylphenol, 2,4-dinonylphenol, styrenated hydroquinone, styrenated alkylphenol nonylated pyrocatechol, alkylphenol novolak resins, o-phenylphenol, p-benzylphenol, nonylated bisphenol A, halogenated bisphenol A, halogenated alkylphenol novolak resins and 2,2'-methylene-bis-p-chlorophenol. Such developers may be used either alone or in a mixture with one or more of the other developers listed above.

Examples of the colorless dyes capable of developing a color by the action of the developer are phthalide series color developing organic compounds such as Crystal Violet Lactone and Malachite Green Lactone; fluoran seris color developing organic compounds such as 3-dimethyl-amino-6-methoxyfluoran, 3,6-diethoxyfluoran, 1,2-benzo-6-diethylaminofluoran, 2-anilino-3-methyl-6-pyrrolidino-fluoran, 3'6'-bis(diethylamino)-spiro(phthalan-1,9'xanthine), and 1,1-bis(p-aminophenyl)phthalan; and spiropyran series color developing organic compounds such as di-$\beta$-naphtho-spiropyran, xantho-$\beta$-naphthospiropyran and benzo-$\beta$-naphthoisospiropyran.

The preferred amount of the colorless dye is from about 1 to about 40% by weight based on the total amount of the ink from the viewpoints of the concentration and the dissolution stability of ink. The ratio of the developer to the colorless dye of from about 1:3 to about 20:1 is preferred from the viewpoints of color density and color stability of ink.

Solvents for ink which are used in the present invention should be those which can dissolve the developer and the colorless dye, but does not inhibit a color developing reaction therebetween. Any of these solvents may be used without particular limitation. As examples of the solvents suitable for the present invention, there may be mentioned nonpolar solvents such as 2-methylpentane, hexane, carbon tetrachloride, cyclohexane, heptane, methylcyclohexane, ethylcyclohexane, toluene, xylene, dimethylbenzene, isopropylbenzene, decalin, tetralin, dodecylbenzene, cyclohexylbenzene, methylnaphthalene, dialkylarylmethanes and tetrachloroethylene.

Such solvents for ink may be used either alone or in a mixture with one or more of the other solvents listed above. The preferred amount of the solvent is from about 5 to about 50% by weight based on the total amount of ink from the viewpoints of the stability and the flow characteristics of ink.

We have found from subsequent studies that though the developer which is used for the colorless dye/developer system ink of the present invention can be properly chosen from the various compounds listed above, the fastness of handwriting is greatly influenced by the stability of the developer present in the handwriting written in the ink, and that among these developers novolak type phenolic resins are particularly preferred since the resins are stably present in the handwriting without being evaporated or removed by external heat, light, water, etc. and hence, can give fast handwriting whose color density at the time of writing does not fade.

Further, we have found that when the novolak type phenolic resins are used as the developer, preferred solvents for the developer and the colorless dye are aromatic alcohols and ethylene glycol monophenyl ether. Since these solvents are polar compounds, they possess a desensitizing action. Thus, it seems that they would inhibit a color developing reaction in the colorless dye/developer system and hence, they could not be used as solvents for ink. However, these polar solvents are effective solvents for ink in the present invention. The reason why they can be effectively used in the present invention is thought to be due to the fact that since the novolak type phenolic resins and the colorless dye are well dissolved in the aromatic alcohols and ethylene glycol monophenyl ether and thereby the color developing reaction is accelerated, the color developing reaction takes precedence over the desensitizing action which the polar solvents possess. Since the colorless dye and the developer are well dissolved in such polar solvents, there can be obtained ink having practically good physical properties in which there is no fear of precipitating insoluble matters with time.

Examples of the aromatic alcohols are benzyl alcohol, β-phenylethyl alcohol, 3-phenyl-1-propanol, 4-phenyl-2-butanol and methylphenylcarbinol. On the other hand, the reason why ethylene glycol monophenyl ether is chosen from among glycols and used is that its desensitizing action is weaker than that of other glycols.

In one preferred embodiment of the above-mentioned colorless dye/developer ink i.e. ink employing a novolak type phenolic resin developer, the preferred amount of the colorless dye is from about 10 to 30% by weight based on the total amount of ink, the preferred ratio of the novolak type phenolic resin developer to the colorless dye is from about 1:3 to about 10:1, and the preferred amount of the solvent such as an aromatic alcohol or ethylene glycol monophenyl ether is from about 25 to about 50% by weight based on the total amount of ink.

In the above embodiment of the colorless dye/developer system employing the novolak type phenolic resin developer, resistance to fading and fastness, when exposed to sunlight over a long period of time, can be further improved by adding a metal salt of an aromatic carboxylic acid to the ink and dissolving it. As examples of the metal salts of the aromatic carboxylic acids, there may be mentioned those having at least one hydroxyl group on the aromatic ring. The metal salts of aromatic carboxylic acids having said hydroxyl group at ortho-position are particularly preferred. Examples of the aromatic carboxylic acids are salicylic acid, 5-tert-butylsalicylic acid, 3-phenylsalicylic acid, 3-methyl-5-tert-butylsalicylic acid, 3,5-di-tert-butylsalicylic acid, 3,5-diamylsalicylic acid, 3-cyclohexylsalicylic acid, 3-methyl-5-isoamylsalicylic acid, 5-isoamylsalicylic acid, 3,5-di-sec-butylsalicylic acid, 5-nonylsalicylic acid, 2-hydroxy-3-methylbenzoic acid, m-cresotinic acid, 5,5'-methylenedisalicylic acid, 2,4-dihydroxybenzoic acid, 2,5-dihydroxybenzoic aicd, 2,6-dihydroxybenzoic acid, anacardic acid, 1-hydroxy-2-naphthoic acid, 2-hydroxy-3-naphthoic acid, 2-hydroxy-1-naphthoic acid and 3-phenyl-5-($\alpha,\alpha'$-dimethylbenzyl)-salicylic acid. Examples of metals which are used for forming the metal salts of the aromatic carboxylic acids, are zinc, aluminum, tin and nickel. Such metal salts of the aromatic carboxylic acids may be used either alone or in a mixture with one or more of the other metal salts of the aromatic carboxylic acids listed above. Said metal salt of the aromatic carboxylic acid is used in an amount ranging from 0.1 to 20% by weight based on the total amount of ink.

In the above embodiment of the colorless dye/developer system ink employing the novolak type phenolic resin developer, there is a possibility in some cases that the erased handwriting has a tendency to be again colored slightly yellow when traces of erased ink marks are left to stand over a long period of time after the handwriting written in the ink is erased with the eraser for the ink. Such slight re-coloration after erasing and then standing over a long period of time can be almost completely inhibited by adding a phosphite triester to the ink. As the phosphite triester, those derived from alcohols having five or more carbon atoms are preferred. Examples of the esters include trinonylphenyl phosphite, tricresyl phosphite, dinonylphenyl 2-ethylhexyl phosphite, tridodecylphenyl phosphite, di-2-ethylhexyl phenyl phosphite, di-2-ethylhexyl nonylphenyl phosphite, dicresyl 2-ethylhexyl phosphite, dicresyl octyl phosphite, dicresyl nonylphenyl phosphite, o-biphenyl nonylphenyl phosphite, tris-isopropylidenephenyl phosphite and tris-4,4'-methylenebisphenyl phosphite. Such phosphite triesters may be used either alone or in a mixture with one or more of the other triesters listed above. The triester is used in an amount of at least 0.2% by weight based on the total amount of ink. Liquid phosphite triesters have good compatibility with the novolak type phenolic resin. Hence, the triester may be used as part of the solvent. In such a case, the liquid phophite triester may be used in an amount ranging up to 30% by weight based on the total amount of ink.

If desired, a resin which does not inhibit color development may be used in order to control the viscosity of ink or the fixing properties of handwriting. Examples of said resins are polybutene, a styrene/butadiene copolymer, polystyrene and poly-α-olefins. If desired, there may be also used a lubricant such as paraffin wax, polyolefin wax or metallic soap in order to control the lubricity of ink. In the preparation of ink for a ball point pen, polyvinyl pryrrolidone, polyvinyl butyral, polyvinyl ether, oleic acid and oleates may be added to the ink to control the viscosity of ink.

To be brief, the ink which is used in the present invention can be easily produced by mixing the developer, the colorless dye and the solvent for ink in an apparatus which is generally used in the production of ink, such as a kneader, a three-roll ink mill or a heating agitator.

When it is desired to add a resin and a lubricant, these components may be added to the above components and mixed in a similar manner.

Handwriting written in the above ink can be easily erased by using a desensitizing polar compound such as an alcohol, a ketone, an ether, an amine or an amide. It is thought that a colored complex formed by the reaction between the developer and the electron-donating colorless dye is decomposed by the desensitizing action of the polar compound, and as a result, the handwriting is made colorless. When an easily vaporizable polar compound is used as an eraser, there is a tendency that when the eraser is completely vaporized from the erased surface, the electron-donating dye which has been made colorless is again reacted with the developer whereby the erased handwriting reappears. On the other hand, when the polar compound as the eraser is difficulty vaporizable and remains stable with time, the compound exhibits a stable erasing property over a long period of time after erasing and the erased handwriting no longer reapperears. However, when writing is attempted on the erased surface in the same ink immediately after erasing, there is a tendency that newly written handwriting is made colorless by the eraser remaining on said erased surface. Accordingly, in order to erase handwriting so as to be able to re-write in the same ink even immediately after easing, there should be used polar compounds which are solid at ordinary temperature such that they exhibit a desensitizing action in a molten state and can erase ink, but they are solidified and no longer exhibit the desensitizing action if the solvent is vaporized off. Even when such polar solvents are used, low-volatility compounds are preferred in order to impart a stable erasing property. As polar compounds satisfying the above necessary condition, desensitizing compounds having a melting point of 60° C. or higher, but a vapor pressure of 1 mmHg or lower, or boiling point of 320° C. or higher are preferred. As examples of such compounds there may be mentioned diphenyl phthalate, diphenylurethane, pentaerythritol tetraacetate, pentaerythritol tetrabenzoate, diphenylglycolic acid, ethylene glycol dibenzoate, N-phenyl-β-naphthylamine, phenyl N-phenylanthranilate, methyl N-phenylanthranilate, benzoguanamine, 4,4'-methylenebis(acetanilide), 4,4'-sulfonyl-bis(acetanilide), p-amino-acetanilide, benzacetin, 4-butoxy-N-hydroxybenzeneacetamide, 2,3-dihydro-2,2-dimethyl-7-benzofuranol methylcarbamate, cotoin, diaminodiphenylmethane, dianisidine, 4-(phenylmethyl phenol) carbamate, galactitol, diphenyl phthalate, 4'-(methylsulfamoyl)sulfanilylanilide, 4,4'-tetramethyldiaminodiphenylmethane, polyvinyl pyrrolidone, polyvinyl acetate, N-vinylpyrrolidone/vinyl acetate copolymer, ketone resins, oligo-N-methylmorpholinium propylene oxide, polyacrylates, polymethacrylates, polyesters, urea/formaldehyde resins, ethyleneurea/formaldehyde resins, ethyleneurea/butyraldehyde resins, poly-N-butoxymethyl-acrylamide and vinylacetate/maleic acid copolymers.

As solvents for dissolving the above desensitizing compounds, volatile solvents boiling at 160° C. or lower are preferred. As examples of such solvents there may be mentioned methanol, ethanol, propanol, butanol, tetrahydrofuran, diisopropyl ether, acetone, methyl isobutyl ketone, ethyl acetate, butyl acetate, toluence, xylene, 1,1,1-trichloroethane, trichloroethylene, perchloroethylene, methyl ethyl ketone, methyl cellosolve, ethyl cellosolve, dimethylformamide, 2-nitropropane and dioxane. Among these solvents, the alcohols, the esters, the ethers, the ketones or mixtures thereof are particularly preferred since they possess a strong handwriting-dissolving power, thereby facilitating a smooth reaction between the ink and the desensitizer to exhibit a rapid erasing action.

In the preparation of an eraser by dissolving in the above solvent a desensitizing organic compound which is solid at ordinary temperatures, it is preferred to dissolve the desensitiing organic compound in said solvent in such a proportion as to give a concentration of from 2 to 40% by weight.

In order to improve the fixing properties and the migration characteristics of the eraser, a resin which does not inhibit re-writing may be added to an eraser solution. Examples of such resins are petroleum resin, polystyrene or a styrene/butadiene copolymer.

In erasing handwriting written in a colorless dye/developer ink by using such an eraser solution, the eraser solution may be coated on the handwriting by means of a brush, etc. Alternatively, a container for marking pen type writing utensils such as a pen provided with a felt wick is filled with said eraser solution for use.

A simpler method for use is that said eraser solution is microencapsulated, the resulting microcapsules are combined together with a solidifying agent, and the resulting solid is used in the same manner as solid erasers. The microencapsulation of the eraser solution can be conducted by any of conventional techniques such as coacervation method, in-situ polymerization method and in-liquid drying method. When the particle size of the capsule is from 100 to 1000μ and the thickness of its memberane is from 3–40μ, the capsule can be easily ruptured by slight friction whereby the eraser solution can be effectively coated and excellent stability with time can be imparted. Examples of said solidifying agents for combining capsules are finely divided solidifying agents such as calcined gypsum, resin solutions and waxes such as crayons and pastel crayons. In solidifying the capsule, an extender such as calcium carbonate, talc or clay and additives such as a lubricant, wax and oil may be added in order to control coatability and solid strength.

When said eraser solution is used as a liquid and coated on handwriting on paper, there may be inconvenience in that the eraser solution penetrated through the back of paper, whereby handwriting on the back of paper or on the second page is erased, said handwriting being not to be erased. In order to eliminate such inconvenience, it is desirable to adjust the viscosity of the eraser solution to from 10 to 200 cP at 25° C.

As a method for adjusting the viscosity of the eraser solution, the amount of the non-volatile desensitizer to be added may be adjusted, or a high-molecular desensitizer (having a molecular weight of preferably 1000 or above) having a relatively weak desensitizing action, but a thickening action may be used together with a low-molecular desensitizer having a strong desensitizing action. However, a preferred method is that an organic high-molecular compound such as hydroxypropyl cellulose, polyvinyl butyral, high-molecular polyvinyl pyrrolidone, cellulose acetate butyrate or an ethylene/vinyl acetate copolymer is added. If desired, a thickner such as hydrogenated castor oil, dibenzylidenesorbitol or a metallic soap may be used.

When traces of erased ink marks are exposed to sunlight over a long period of time after erasing handwriting written in ink by using the above eraser solution, particularly when a novolak type phenolic resin is used as a developer for ink, there is a tendency that the handwriting is again colored slightly yellowish brown. In order to avoid such a phenomenon, it is desirable to add an ultraviolet light absorber to the eraser solution and to dissolve the agent therein. The ultraviolet light absorbers suitable for this purpose should be those which are themselves colorless or lightcolored, are substantially not subjected to a color developing reaction with a colorless dye blended with ink and can be dissolved in the eraser solution. Any of these materials may be used without particular limitation. As examples of such ultraviolet light absorbers, there may be mentioned 2-hydroxy-4-octyloxybenzophenone, 2-hydroxy-4-methoxybenzophenone, 2-hydroxy-4-hydroxybenzylbenzophenone, 2-(2'-hydroxy-3',5'-di-tert-butylphenyl)-benzophenone, 5-chlorobenzophenone, 2-(2'-hydroxy-3'-tert-butyl-5'-methylphenyl)-5-chlorobenzotriazole, 2-(2'-hydroxy-5'-methylphenyl)benzotriazole, 4-tert-butylphenyl salicylate, p-octylphenyl salicylate, octoxyphenyl salicylate, nickel 2,2'-thiobis(4-tert-octylphenolate), nickel p-toluenesulfonate and nickel octylbenzenesulfonate. Such ultraviolet light absorbers may be used either alone or in a mixture with one or more of the other ultraviolet light absorbers listed above. The ultraviolet light absorber may preferably be used in an amount ranging from 0.2 to 5% by weight based on the amount of the eraser solution.

When handwriting written in ink on paper is erased by using the above eraser solution, there occurs a phenomenon in some cases that the paper becomes excessively clear or even see-through because a nonvolatile desensitizer present in the eraser remains on the paper. In such a case, traces of erased ink marks look slightly blackened, or they are copied white when subjected to diazotype copying, since the transparency of the paper is enhanced. In order to eliminate such a disadvantage, it is desirable to add a fluorescent brightener to the eraser solution. As said fluorescent brightener, any materials which is itself colorless or lightcolored and can be dissolved in the eraser solution can be used. As examples of such fluorescent brighteners, there may be mentioned naphthalimide fluorescent brighteners such as MIKAWHITE ACR conc., MIKAWHITE AT conc., MIKAWHITE ATN conc. and MIKAWHITE BTN conc. (products of Nippon Kayaku K.K.); pyrazoline fluorescent brighteners such as KAYCOLL C (a product of Nisso Kako K.K.); stilbene fluorescent brightener MIKEPHOL TB conc., MIKEPHOL TA, and MIKEPHOL TA conc. (products of Mitsui Toatsu Kagaku K.K.); coumarin fluorescent brighteners such as KAYCOLL E (a product of Nisso Kako K.K.) and WHITEFLUOR B (a product of Sumitomo Kagaku K.K.); and bisoxazole fluorescent brighteners such as WHITEX SNK, WHITEX SNP nad WHITEX NKR (products of Sumitomo Kagaku K.K.). The fluorescent brightener is used in an amount ranging from 0.001 to 2% by weight based on the amount of the eraser solution.

When a good balance between a whitening effect (which prevents traces of erased ink marks from becoming black) and an effect of preventing the white copying in the diazotype copying can not be obtained, it is preferred to use two or more fluorescent brighteners in combination.

The above-mentioned colorless dye/developer system ink and eraser of this ink can be practically employed in the following manner. The ink can be used by means of conventional writing utensils such as marking pens and ball point pens. FIG. 1 represents a writing utensil 1 having a marking pen type structure of the present invention. Within a barrel 2 there is provided an ink reservoir 3. Ink is supplied through a felt or fibrous wick 4 to a writing nib 5 at the tip of the barrel. The writing nib 5 is formed by protruding the wick member 4 from the tip of the barrel 2. The numeral 6 represents a cap which is detachable from the barrel 2.

Figure 2A:
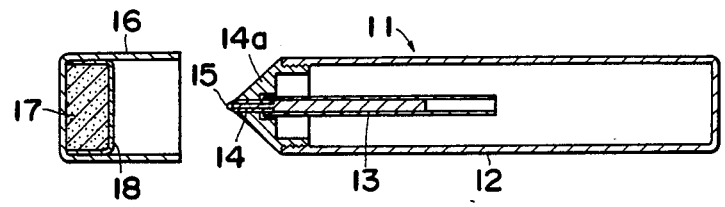
FIG. 2a and FIG. 2b are sectional views showing another embodiment of a ball point pen type writing utensil constituting a set composed of a writing utensil and an erasing utensil of the present invention.
Figure 2B:
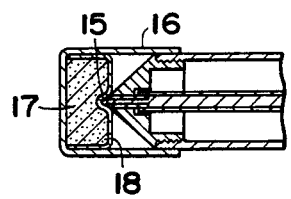

FIG. 2a represents a writing utensil having a ball point pen type structure of the present invention. Within a barrel 12 there is provided an ink reservoir 13. At the top of the ink reservoir there is provided a socket member 14a having a through-hole 14 which forms an ink passage. A writing ball 15 as a writing nib is rotatably housed in and partly protruded from the socket member 14a. The numeral 16 represents a cap which is detachable from the barrel 12. A spongy elastomer 17 is packed in the bottom part of the cap 16 as shown by FIG. 2a. The exposed surface of this elastomer layer 17 is covered with a synthetic resin film 18. When the cap 16 is passed over the writing nib part of the barrel, the writing ball of the writing nib is retained in such a manner that the ball is enclosed through the film 18 in the elastomer layer 17 as shown by FIG. 2b. By retaining the writing ball of the writing nib in such a state, the exposed surface of the writing ball is covered with the film 18 so that the evaporation of ink from the exposed surface of the writing ball is inhibited and the exposed surface of the writing ball can be always retained in a state wetted with the ink. Thus, when the cap 16 is removed and the writing is started to initial blurring due to insufficient ink supply occurs.

Figure 3:
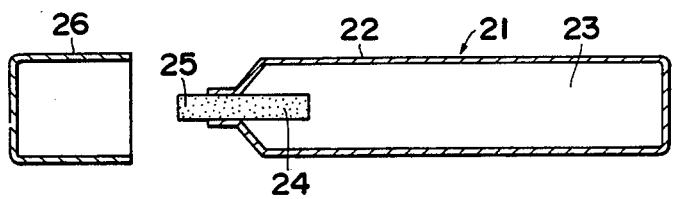
FIG. 3 is a sectional view showing one embodiment of an erasing utensil constituting a combination of a writing utensil and an erasing utensil of the present invention.

The eraser solution for ink may be used not only by applying to the handwriting written in ink by means of a brush, etc., but also in such a manner that a container for a writing utensil such as a marking pen is filled with the eraser solution as shown in FIG. 3. FIG. 3 represents an erasing utensil 21. Within a barrel 22 there is provided an eraser solution reservoir 23. The eraser solution is supplied through a porous passage member 24 composed of a felt, fibrous or porous resin to the tip of the barrel. The coating part 25 of the eraser solution is formed by protruding the porous passage member 24 from the tip of the barrel 22. The numeral 26 represents a cap which is detachable from the barrel 22.

Figure 4:
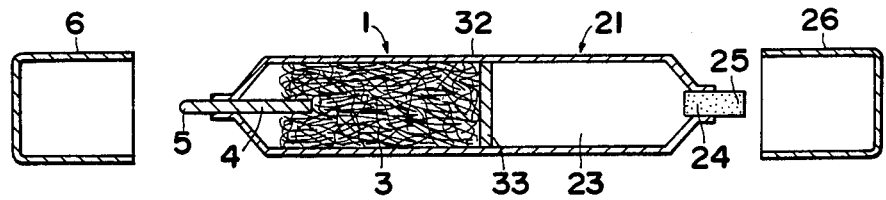
FIG. 4 and FIG. 5 are sectional views showing embodiments of a set of a writing utensil and an erasing utensil of the present invention where a writing means and an erasing means are oppositely provided at the both ends of a barrel.

In the above embodiments, the writing utensil and the erasing utensil are constructed as separate barrels. But, both a marking pen type writing utensil and an erasing utensil can be incorporated into one barrel as shown by FIG. 4. In FIG. 4, one barrel 32 is divided into two compartments by a divider 33. Within one compartment of the barrel 32 there is provided an ink reservoir 3. Within the other compartment of the barrel 32 there is provided an eraser solution reservoir 23. Other constructions are the same as those of the marking pen type writing utensil 1 of FIG. 1 and of the erasing utensil 21 of FIG. 3. The same reference numerals, as in FIGS. 1 and 3, are used to denote the corresponding parts and, therefore, the illustrations for the same parts are omitted.

Figure 5:
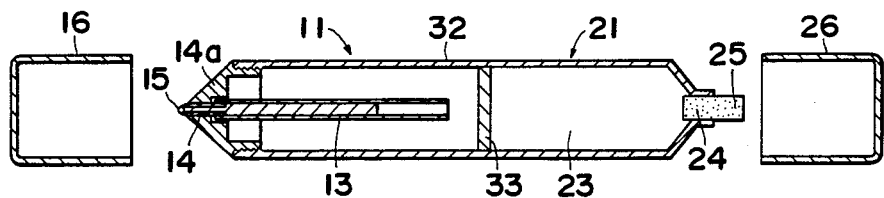

FIG. 5 shows an embodiment where the ball point pen type writing utensil 11 of FIG. 2a and the erasing utensil 21 of FIG. 3 are incorporated into one barrel 32.

Figure 6:
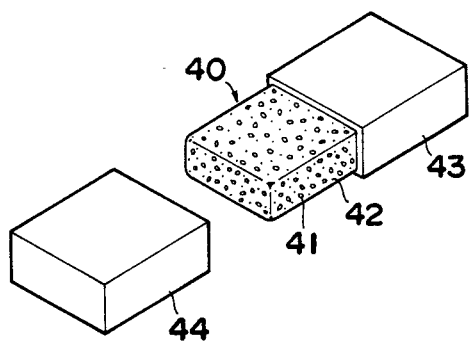
FIG. 6 is a perspective view showing another embodiment of an erasing utensil composed of a solid molded article and constituting a combination of a writing utensil and an erasing utensil of the present invention.

AS stated above, the erasing solution of the present invention is microencapsulated, the microcapsules are combined together by using a solidifying agent and then can be used in the form of a solid molded article as in solid erasers. FIG. 6 shows an eraser 40 in the form of a solid molded article. This solid eraser 40 is constructed of a structure where microcapsules 41 enclosing the eraser solution as a core material are uniformly dispersed in a solidifying agent matrix 42. This solid eraser 40 has a conventional rubber eraser-like appearance, and is preferably housed in plastic case 43 provided with a detachable cap 44.

Figure 7:
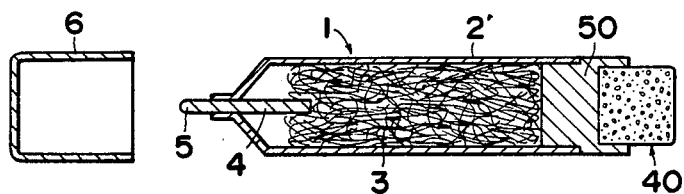
FIG. 7 and FIG. 8 are sectional views showing other embodiments of a combination of a writing utensil and an erasing utensil of the present invention where the erasing utensil composed of a solid molded article is provided at a rear end of the writing utensil.
Figure 8:
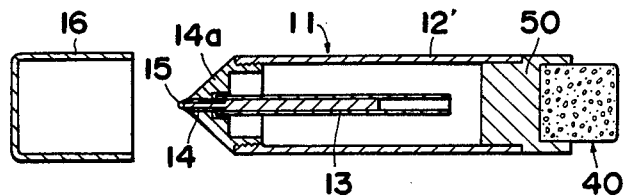

By using the eraser as a solid molded article, the solid eraser 40 can be fixed through a fitting member 50 to the rear end of the barrel 2' of the marking pen type writing utensil 1 as shown by FIG. 7. This solid eraser 40 can be also fixed through the fitting member 50 to the rear end of the barrel 12' of the ball point pen type writing utensil 11 as shown by FIG. 8. Other component parts of FIGS. 7 and 8 are the same as those of FIGS. 1 and 2a. The same reference numerals, as in FIGS. 1 and 2a, are used to denote the corresponding parts and the illustrations for these parts are omitted.

The following examples and comparative examples are provided to illustrate the present invention. Parts given in the examples and comparative examples are by weight.

EXAMPLE 1

Preparation of ink:

| | |
|---|---|
| p-octylphenol novolak resin (developer) | 20 parts |
| p-nonylphenol (developer) | 30 parts |
| crystal violet lactone (colorless dye) | 15 parts |
| decalin (solvent) | 25 parts |

The above blend was dissolved by heating it at 100° C. for an hour, and filtered to remove small amounts of insoluble matters to obtain an ink which is colored blue. A ball point pen (JIS S-6039-1980 E Type for thin characters) wAs filled with this ink. A line was drawn on paper (JIS P-3201 writing paper A) with the above ball point pen. The line was smoothly written in this ink as in usual ball point ink, and a clear blue line was obtained. This line was left to stand at 50° C. for 10 days and was found to be fast without fading.

The above line was completely erased by softly rubbing it with paper soaked with a 30% acetone solution of dioctyl adipate (eraser). Even when the paper was left to stand at 50° C. for 10 days, the erased line did not reappear. Thus the eraser was found to exhibit stable erasability.

EXAMPLE 2

Preparation of ink:

| | |
|---|---|
| 2,2'-methylenebis-p-chlorophenol (developer) | 3 parts |
| 2-methyl-4-nonylphenol (developer) | 5 parts |
| 2-anilino-3-methyl-6-pyrrolidinofluoran (colorless dye) | 2 parts |
| tetrachloroethylene (solvent) | 6 parts |
| benzyl alcohol (solvent) | 2 parts |

The above blend was dissolved by heating it at 100° C. for an hour, and filtered to remove small amounts of insoluble matters to obtain an ink which was colored black. An oily marking pen part (MM50, a product of Pentel K.K.) was filled with this ink. A line was drawn on paper (writing paper A) with the above pen, and a clear black line was obtained. This line was left to stand at 10° C. for 10 days, and was found to be fast without fading.

Preparation of eraser:

| | |
|---|---|
| diphenyl phthalate (desensitizer) | 15 parts |
| polyester resin (desensitizer) (VYLON #200, a product of Toyo Boseki K.K.) | 5 parts |
| toluene (solvent) | 80 parts |

The above components were mixed together and dissolved by stirring them at 50° C. for an hour to obtain an eraser solution. A marking pen part having a felt wick (F50, a product of Pentel K.K.) was filled with the above eraser solution to produce an erasing utensil. When the line written in the above black ink was rubbed with this erasing utensil three or four times, the line was completely erased. One minute after erasing, rewriting was attempted on the erased surface in the above black ink and a clear black line was drawn. The rewritten line was not faded after the lapse of 10 days. The erased line did not reappear.

EXAMPLE 3

Preparation of ink:

| | |
|---|---|
| Novolak type phenolic resin (TAMANOL PA, a product of Arakawa Kagaku K.K.) (developer) | 30 parts |
| colorless fluoran dye (BK-14, a product of Yamada Kagaku Kogyo K.K.) | 20 parts |
| benzyl alcohol (solvent) | 20 parts |
| ethylene glycol monophenyl ether (solvent) | 30 parts |

The above blend was dissolved by heating it at 100° C. for an hour, and filtered to remove small amounts of insoluble matters to obtain an ink of the present invention which was colored black.

A ball point pen (E type for thin characters) was filled with this ink. A line was drawn on paper (writing paper A) with this pen. Handwriting at the time of writing was examined. Then this handwriting was left to stand at 50° C. for 7 days, and the change of the handwriting with time was also examined. The results are shown in Table 1.

Preparation of eraser:

| | |
|---|---|
| N—vinyl pyrrolidone/vinyl acetate copolymer (desensitizer) | 7.5 parts |
| ethanol (solvent) | 89.5 parts |
| high-molecular polyvinylpyrrolidone (having an average molecular weight of 360,000) (viscosity | 3 parts |

-continued

| | |
|---|---|
| modifier) | |

The above components were dissolved by stirring to prepare an eraser solution. An oily marking pen part (M-10, a product of Pentel K.K.) was filled with this eraser solution. The above handwriting written in the above black ink was rubbed with this eraser a few times, and it was found that the handwriting was clearly erased.

COMPARATIVE EXAMPLE 1

Preparation of ink:

| | |
|---|---|
| bisphenol F (developer) | 30 parts |
| colorless fluoran dye (BK-14) | 20 parts |
| benzyl alcohol (solvent) | 20 parts |
| ethylene glycol monophenyl ether (solvent) | 30 parts |

Ink was prepared in a similar manner to that of Example 3 except that bisphenol F as the developer was substituted for the novolak type phenolic resin in Example 3. Handwriting at the time of writing and the change with time were examined. The results are shown in Table 1.

COMPARATIVE EXAMPLE 2

Preparation of ink:

| | |
|---|---|
| Novolak type phenolic resin (TAMANOL PA) (developer) | 30 parts |
| colorless fluoran dye (BK-14) | 20 parts |
| diethylene glycol monobutyl ether (solvent) | 30 parts |

Ink was prepared in a similar manner to that of Example 3 except that diethylene glycol monobutyl ether was used as the solvent instead of benzyl alcohol and ethylene glycol monophenyl ether in Example 3. Handwriting at the time of writing and the change with time were examined. The results are shown in Table 1.

TABLE 1

| | Handwriting at the time of writing | After standing at 50° C. for 7 days |
|---|---|---|
| Example 3 | clear black line | almost no change |
| Comparative Example 1 | clear black line | about 90% fading* |
| Comparative Example 2 | almost colorless | black line |

*Note:
Calculated based on the measurement of Y value (reflectance) by means of Hunter color difference meter. For example, supposing that the Y value of paper is 70%, that of handwriting immediately after writing is 56% and the difference therebetween is 14%. When the Y value of the handwriting becomes 63% after the lapse of a certain time and the difference between the Y values of paper and the handwriting becomes 7%, the result is defined as 50% fading. Similarly, when the Y value of the handwriting becomes 70% and the difference between the Y values of paper and the handwriting becomes zero, the result is defined as 100% fading.

As seen from Table 1, a clear line can be written in the ink of Example 3 according to the present invention as well as in ball point pen oily ink. The written line is not faded in the severe test at 50° C. for 7 days. Therefore, this ink is suitable as ink which can give fast handwriting. On the other hand, there is no difference between the results of Comparative Example 1 and Example 3 at the time of writing, but the handwriting of Comparative Example 1 has a tendency to be faded with time. It is clear from these facts that an ink employing the novolak type phenolic resin as a developer gives a stable color, that is, faster handwriting than that employing bisphenol A alone as a developer. The handwriting of Comparative Example 2 was almost colorless at the time of writing and illegible. This result is thought to be due to the fact that a color developing reaction between the developer and the colorless dye is inhibited since a polar compound having a strong desensitizing action is used as a solvent. After the evaporation of the solvent, the handwriting become dense and the fading of the handwriting with time was little observed, since the novolak type phenolic resin was used as a developer.

EXAMPLE 4

Preparation of ink:

| | |
|---|---|
| Novolad type phenolic resin (TAMANOL PA) (developer) | 30 parts |
| colorless fluoran dye (PSD 150, a product of Nisso Kako K.K.) | 25 parts |
| β-phenylethyl alcohol (solvent) | 43 parts |
| oleic acid (lubricant) | 2 parts |

The above blend was dissolved by heating it at 100° C. for an hour and filtered to remove small amounts of insoluble matters to obtain an ink of the present invention which was colored black.

This ink was applied on paper (writing paper A) by means of a knife coating method to prepare a sample. The degree of fading of this sample after testing for 5 hours by using a fade meter and after standing at 50° C. for 7 days and color changes after immersion in water for 10 hours were inspected. The results are shown in Table 2.

COMPARATIVE EXAMPLE 3

Preparation of ink:

| | |
|---|---|
| nonylphenol (developer) | 30 parts |
| colorless fluoran dye (PSD 150) | 25 parts |
| β-phenylethyl alcohol (solvent) | 43 parts |
| oleic acid (lubricant) | 2 parts |

The procedure of Example 4 was repeated with the exception that nonylphenol was used as the developer instead of the novolak type phenolic resin in Example 4. The degree of fading of a sample after testing for 5 hours by using a fade meter and after standing at 50° C. for 7 days, and color changes after immersion in water for 10 hours were inspected. At the same time, the ink of Comparative Example 1 and commercially available ball point pen oily ink (a product of corporation A) were subjected to the test. The results are shown in Table 2.

TABLE 2

| | Degree of fading after testing for 5 hr by using a fade meter, NBS | Degree of fading after standing at 50° C. for 7 days, NBS | Color changes after immersion in water for 10 hr |
| --- | --- | --- | --- |
| Example 4 | 2.1 | 0.1 | No change |
| Comparative Example 1 | 40.1 | 42.1 | Considerably faded |
| Comparative Example 2 | 60.3 | 58.5 | Considerably faded |
| Commercially available ball point pen oily ink | 3.2 | 0.09 | Somewhat blotted |

As seen from Table 2, the fading degree of the ink of Example 4 according to the present invention is comparable with that of commercially available ball point pen oily ink. In the test for color changes after immersion in water for 10 hour, the ink of Example 4 is superior in fastness to commercially available ball point pen oily ink. Inks of Comparative Examples 1 and 3 in which bisphenol F alone or p-nonylphenol alone is used as a developer, are liable to be faded and no fast handwriting can be obtained.

Handwritings written in the inks prepared in Example 4 and Comparative Examples 1 to 3 were rubbed a few times by using an eraser prepared in Example 3. Any of the handwritings could be erased.

EXAMPLE 5

Preparation of ink:

| | |
| --- | --- |
| p-nonylphenol (developer) | 3 parts |
| Crystal Violet Lactone (colorless dye) | 1.5 parts |
| cyclohexylbenzene (solvent) | 2.5 parts |
| Novolak type phenolic resin (HITANOL #1501, a product of Hitachi Kasei K.K.) (developer & viscosity modifier) | 2 parts |

The above components were mixed together and stirred at 100° C. for 30 minutes to prepare a blue ink. A ball point pen (JIS S 6039-1980 E type for medium characters) was filled with this ink to prepare a writing utensil whose handwriting was erasable with the eraser of the present invention.

Preparation of eraser:

| | |
| --- | --- |
| 4,4'-methylenebis (acetanilide) (m.p. 236° C.) (desensitizer) | 2 g |
| methanol (solvent) | 4 g |
| ethanol (solvent) | 4 g |

The above components were mixed together and stirred at 50° C. for an hour to prepare an eraser solution of the present invention. An oily marking pen part (MM50) was filled with this eraser solution to prepare an erasing utensil. Handwriting written with the above ball point pen was softly rubbed a few times with this erasing utensil. The handwriting was completely erased. 20 seconds after erasing, rewriting was attempted on the erased surface with the same ball point pen and clear handwriting was obtained which did not disappear with time.

For comparison, an eraser solution was prepared in a similar manner to that of the above preparation except that triethanol amine was substituted for 4,4'-methylenebis (acetanilide). Handwriting written with the above ball point pen was softly rubbed a few times with this eraser solution. The handwriting was completely erased. However, when rewriting was attempted on the erased surface with the same ball point pen one minute, five minutes, an hour and one day after erasing, handwriting was instantaneously erased in each case.

EXAMPLE 6

Preparation of eraser:

| | |
| --- | --- |
| polyvinyl acetate (GOSENYL E50Z2, a product of Nippon Gosei K.K.) (densensitizer) | 3 g |
| ketone resin (HILAC 110H, a product of Hitachi Kasei K.K.) (densensitizer) | 1 g |
| ethyl acetate (solvent) | 5 g |
| methanol (solvent) | 5 g |

The above components were mixed together and dissolved by heating to prepare an eraser solution of the present invention. An oily marking pen part (MM50 was filled with this eraser solution to prepare an erasing utensil. Handwriting written with the ball point pen obtained in Example 5 was softly rubbed a few times with this erasing utensil. The handwriting was completely erased. 30 seconds after erasing, rewriting was attempted on the erased surface with the same ball point pen. The obtained clear handwriting was not erased with time.

EXAMPLE 7

Preparation of eraser:

| | |
| --- | --- |
| ketone resin (HILAC 111, softening point: 100° C., a product of Hitachi Kasei K.K.) (densensitizer) | 5 g |
| toluene (solvent) | 25 g |

The above components were mixed together and dissolved by heating to prepare an eraser solution of the present invention. 9 g of this eraser solution was emulsion-dispersed in 30 g of a 10% aqueous gelatin solution and 30 g of a 10% aqueous gum arabic solution was added thereto. The mixture was stirred at a high speed to effect emulsifying dispersion. Then 140 ml of warm water was added thereto at 40° C. and the mixture was stirred at a medium speed. To this was added dropwise 10% acetic acid to adjust the pH to 4.1. This dispersion was kept at 40° C. for two hours and then slowly cooled to 5° C. Then 0.5 ml of glutaraldehyde was added thereto and the mixture was left to stand overnight, decanted, washed with warm water and air-dried to obtain 10.5 g of microcapsules having a particle size of from 10 to 50μ and enclosing said eraser solution as a core material therein.

These microcapsules were solidified in the following manner.

| | |
|---|---|
| microcapsules | 10.5 parts |
| paraffin was (130° F.) | 2.0 parts |
| distearyl ketone | 6.0 parts |
| microcrystalline wax | 1.0 part |
| hardened oil | 1.5 parts |
| talc | 3.0 parts |

The above components were mixed together. The mixture was molten by heating, gently stirred, cast into a crayon-shaped mold and cooled to solidify. Then the shaped article was removed to obtain an eraser in the form of a solid eraser. Handwriting written with the ball point pen obtained in Example 5 was rubbed 7 or 8 times with this eraser to find that the handwriting was completely erased. 30 seconds after erasing, rewriting was attempted on the erased surface with the same ball point pen and clear handwriting was obtained. This handwriting was not erased with time. Further, the handwriting which had been previously erased did not reappear.

EXAMPLE 8

The procedure of Example 7 was repeated except that the emulsifying dispersion was conducted under a very gentle stirring in the microencapsulation of the eraser solution in Example 7. There was obtained 10.5 g of microcapsules having a particle size of from 150 to 300μ and a membrane thickness of from 10 to 15μ and enclosing the eraser solution as a core material therein.

Then a solid eraser was prepared from the above microcapsule in the same manner as that of Exmple 7. Handwriting written with the ball point pen obtained in Example 5 was rubbed 3 to 4 times with the above eraser and was found to be completely erased. Rewriting was attempted on the erased surface with the same ball point pen 30 seconds after erasing. The obtained clear handwriting was not erased with time. Further, the handwriting which had been erased did not reappear.

EXAMPLE 9

Preparation of eraser:

| | |
|---|---|
| N—vinylpyrrolidone/vinyl acetate copolymer (3:7) (densensitizer) | 7.5 parts |
| ethanol (solvent) | 87.5 parts |
| high-molecular polyvinyl pyrrolidone (average molecular weight: 360,000) (viscosity modifier) | 0–8 parts |

The above components were mixed together and stirred at 50° C. for an hour to produce ink erasers having different viscosities. An oily marking pen part was filled with each of the above ink erasers to prepare an erasing utensil. Erasing performance was tested in the following manner. Handwriting written with the ball point pen (blue ink) obtained in Example 5 was rubbed a few times with the eraser. Writing was attempted on both sides of a commercially available notebook (using water marked foolscap) with the above ball point pen. The erasability of the handwriting on the back was inspected when the handwriting on the surface was erased. The results are shown in Table 3.

TABLE 3

| Amount of high-molecular polyvinyl pyrrolidone (parts) | viscosity of eraser** (cP) | erasing performance | erasability on the back |
|---|---|---|---|
| 0 | 8.5 | excellent | yes |
| 0.5 | 10 | excellent | almost none* |
| 2 | 22 | excellent | none |
| 3 | 38 | excellent | none |
| 5 | 80 | excellent | none |
| 7.5 | 200 | good | none |
| 8 | 235 | not good | none |

Note:
*Handwriting was slightly blotted.
**The viscosity was measured by using an EL type viscometer (a product of Tokyo Keiki K.K.) with a rotor speed of 10 r.p.m. at 25° C.

It can be seen from the above results that if the viscosity of the eraser is in the range of from 10 to 200 cP, the handwriting can be effectively erased and the one on the back can be prevented from being erased.

Traces of eerased ink marks did not reappear even after a week. Rewriting was attempted on the erased surface with the same ball point pen ink containing blue ink 90 seconds after erasing. Clear handwriting was obtained. The rewritten part did not become pale even after a week.

EXAMPLE 10

Preparation of eraser:

| | |
|---|---|
| N—vinylpyrrolidone/vinyl acetate copolymer (3:7) (desensitizer) | 15 parts |
| ethanol (solvent) | 85 parts |

The above components was mixed together and stirred at 50° C. for an hour to prepare an ink eraser. Since the amount of the desensitizer in this solution was larger than that of the dessensitizer in Example 9, the viscosity thereof was 22 cP at 25° C. without the addition of any viscosity modifier.

Handwriting written on both sides of a notebook with the ball point pen (blue ink) obtained in Example 5 was softly rubbed with a manicure brush having a small amount of the above eraser coated thereon. The handwriting was completely erased. Rewriting was attempted with the same blue ink ball point pen 2 minutes after erasing. Clear handwriting was obtained. Handwriting on the back of the notebook was slightly blotted in some places, but not erased.

EXAMPLE 11

Preparation of eraser:

| | |
|---|---|
| diphebnyl phthalate (desensitizer) | 20 parts |
| saturated polyester resin (VYLON-200 a product of Toyo Boseki K.K.) (high-molecular desensitizer) | 10 parts |
| toluene (solvent) | 70 parts |

The above components were moxed together and stirred at 70° C. for an hour to prepare an ink eraser having a viscosity of 35.4 cP at 25° C. An oily marking pen part (M-10) was filled with this eraser to produce an erasing utensil. Handwriting written on both sides of a notebook with the blue ink ball point pen obtained in Example 5 was rubbed a few times with said eraesr. The handwriting was completely erased. Rewriting was attempted on the erased traces with the same blue ink ball point pen one minute after erasing. Clear handwriting was obtained. Handwriting on the back of the notebook was slightly blotted in some places, but not erased.

EXAMPLE 12

Preparation of ink:

| | |
|---|---|
| p-cresol novolak resin (developer) | 30 parts |
| 4,4'-methylenebisphenol (developer) | 10 parts |
| 2-anilino-3-methyl-6-pyridinofluoran (colorless dye) | 10 parts |
| benzyl alcohol (solvent) | 30 parts |
| methylnaphthalene (solvent) | 10 parts |

The above components were mixed together. The mixture was dissolved by heating at 100° C. for an hour and filtered to remove small amounts of insoluble matters to obtain an ink which was colored black. A ball point pen (E type for thin characters) was filled with this ink. A line was drawn on paper (writing paper A) with this ball point pen. The line was smoothly written in this ink as in usual ball point ink. A clear black line was obtained. The written line was left to stand for three months and found to be fast without fading.

Preparation of eraser:

| | |
|---|---|
| ethyleneurea-formaldehyde resin (desensitizer) | 10 parts |
| isobutyl acetate (solvent) | 85 parts |
| cellulose acetate butyrate (viscosity modifier) | 5 parts |

The above components were mixed together and stirred at 70° C. for an hour to prepare an ink eraser having a viscosity of 57.5 cP at 25° C. An oily marking pen part (M-10) was filled with this eraser to produce an erasing utensil. Handwriting written on both sides of a notebook with the above black ink ball point pen was rubbed a few time with the above eraser. The handwriting was completely erased. Rewriting was attempted with the same black ink ball point pen one minute after erasing. Clear handwriting was obtained. Handwriting on the back of the notebook was left unchanged.

EXAMPLE 13

Preparation of ink:

| | |
|---|---|
| Novolak type phenolic resin (TAMANOL PA) (developer) | 25 parts |
| Crystal Violet Lactone (colorless dye) | 20 parts |
| benzyl alcohol (solvent) | 30 parts |
| enthylene glycol monophenyl ether (solvent) | 20 parts |
| zinc 5-tert-butylsalicylate | 5 parts |

A blue ink ball point pen was prepared in a similar manner to that of Example 12 by employing the above components. Writing was attempted on paper with this ball point pen by means of a drawing apparatus (load: 200 g, speed: 7 cm/sec; angle: 70°). The resulting handwriting was tested for 5 hours by a fade meter, and the degree of fading was inspected. The results are shown in Table 4.

COMPARATIVE EXAMPLE 4

Preparation of ink:

| | |
|---|---|
| Novolak type phenolic resin (TAMANOL PA) | 30 parts |
| Crystal Violet Lactone | 20 parts |
| benzyl alcohol | 30 parts |
| ethylene glycol monophenyl ether | 20 parts |

Blue ink having the above composition was prepared in a similar manner to that of Example 13 except that zinc 5-tert-butylsalicylate was omitted from the ink composition of Example 13. The degree of fading of handwriting was inspected in a similar manner to that of Example 13. At the same time, the degree of fading of handwriting written with a commercially available oily blue ink ball point pen was inspected. The results are shown in Table 4.

EXAMPLE 14

Preparation of ink:

| | |
|---|---|
| Novolak type phenolic resin (TAMANOL PA) (developer) | 25 parts |
| colorless fluoran dye (BK-14) | 20 parts |
| benzyl alcohol | 20 parts |
| ethylene glycol monophenyl ether | 30 parts |
| zinc 3-methyl-5-tert-butylsalicylate | 5 parts |

A black ink ball point pen was prepared in a similar manner to that of Example 13 by employing the above components. The degree of fading of handwriting written with this black ink ball point pen was inspected in a similar manner to that of Example 13. The results are shown in Table 4.

COMPARATIVE EXAMPLE 5

Preparation of ink:

| | |
|---|---|
| Novolak type phenolic resin (TAMANOL PA) | 30 parts |
| colorless fluoran dye (BK-14) | 20 parts |
| benzyl alcohol | 20 parts |
| ethylene glycol monophenyl ether | 30 parts |

Black ink having the above composition was prepared in a similar manner to that of Example 14 except that zinc 3-methyl-5-tert-butylsalicylate was omitted from the ink composition of Example 14. The degree of fading of handwriting written in this ink was inspected in a similar manner to that of Example 14. At the same time, the degree of fading of handwriting written with a commercially available oily black ink ball point pen (a product of corporation B). The results are shown in Table 4.

TABLE 4

| | The degree of fading after testing for 5 hr by fade meter, NBS |
|---|---|
| Example 13 (blue ink) | 2.5 |
| Comparative Example 4 (blue ink) | 7.0 |
| Commercially available oily ball point pen (blue ink) | 2.3 |
| Example 14 (black ink) | 1.3 |
| Comparative Example 5 (black ink) | 2.4 |
| Commercially available oily ball point pen (black ink) | 1.2 |

It can be seen from Table 4 that resistance to fading of ink handwriting is improved by adding a metal salt of an aromatic carboxylic acid to ink and becomes approximately comparable with that of handwriting written with a commercially available oily ball point pen.

Handwritings written in the ink of Example 13, 14 and Comparative Examples 4, 5 can be erased with the ink eraser prepared in Example 3.

EXAMPLE 15

Preparation of ink:

| | |
|---|---|
| Novolak type phenolic resin (TAMANOL PA) (developer) | 25 parts |
| Novolak type phenolic resin (TAMANOL #510, a product of Arakawa Kagaku K.K.) (developer) | 5 parts |
| colorless fluoran dye (BK-14) | 20 parts |
| benzyl alcohol | 20 parts |
| ethylene glycol monophenyl ether | 20 parts |
| trinonylphenyl phosphite | 10 parts |

The above components were mixed together and dissolved to prepare a black ink. A line was written on paper in this ink. The resulting handwriting was left to stand at 50° C. for 7 days and was found to be unchanged.

Preparation of eraser:

| | |
|---|---|
| ethyleneurea-butyraldehyde resin (desensitizer) | 10 parts |
| ethanol (solvent) | 70 parts |
| dioxane (solvent) | 18.5 parts |
| high-molecular polyvinylpyrrolidone (an average moleculor weight of 360,000) (viscosity modifier) | 1.5 parts |

The above components were mixed together and dissolved to produce an eraser solution. An oily marking pen part (M-10) was filled with this solution to prepare an erasing utensil. Handwriting written in the above ink was rubbed a few times with this erasing utensil and clearly erased. The erased trace was left to stand at 50° C. for a month but was not colored. Further, the handwriting did not reappear.

COMPARATIVE EXAMPLE 6

Preparation of ink:

| | |
|---|---|
| Novolak type phenolic resin (TAMANOL PA) | 25 parts |
| Novolak type phenolic resin (TAMANOL #510) | 5 parts |
| colorless fluoran dye (BK-14) | 20 parts |
| benzyl alcohol | 20 parts |
| ethylene glycol monophenyl ether | 30 parts |

Black ink having the above composition was prepared in a similar manner to that of Example 15 except that trinonylphenyl phosphite was omitted from the ink composition of Example 15. Handwriting written in this ink was left to stand at 50° C. for 7 days and was found to be stable without any changes.

This handwriting was erased with the eraser prepared in Example 15. The erased trace was left to stand at 50° C. for a month. It was found that handwriting was slightly colored.

EXAMPLE 16

Preparation of ink:

| | |
|---|---|
| Novolak type phenolic resin (TAMANOL PA) (developer) | 30 parts |
| colorless fluoran dye (PSD150) | 20 parts |
| β-phenylethyl alcohol (solvent) | 45 parts |
| dicresyl 2-ethylhexyl phosphite | 5 parts |

The above components was mixed together and dissolved to prepare a black ink. A ball point pen (E type for thin characters) was filled with this ink. Writing was attempted on paper with this ball point pen. Clear black handwriting was obtained. This handwriting was left to stand at 50° C. for 7 days and was found to be stable without any changes.

This handwriting was erased with the erasing utensil prepared in Example 15. The erased trace was left to stand at 50° C. for a month. It was found that the erased trace was not colored.

COMPARATIVE EXAMPLE 7

Preparation of ink:

| | |
|---|---|
| Novolak type phenolic resin (TAMANOL PA) (developer) | 30 parts |
| colorless fluoran dye (PSD150) | 20 parts |
| β-phenylethyl alcohol (solvent) | 50 parts |

Black ink having the above composition was prepared in a similar manner to that of Example 16 except that dicresyl 2-ethlhexyl phosphite was omitted from the ink composition of Example 16. Handwriting written in this ink was left to stand at 50° C. for 7 days and was found to be stable without any changes.

This handwriting was erased with the erasing utensil prepared in Example 15. The erased trace was left to stand at 50° C. for a month. It was found that the erased trace was slightly colored.

EXAMPLE 17

Preparation of ink:

| | |
|---|---|
| Novolak type phenolic resin (TAMANOL PA) (developer) | 10 parts |
| Novolak type phenolic resin (p-cresol/formalin precondensate) | 20 parts |
| colorless fluoran dye (BK-14) | 15 parts |
| Crystal Violet Lactone (colorless dye) | 2 parts |
| benzyl alcohol (solvent) | 30 parts |
| ethylene glycol mophenyl ether (solvent) | 23 parts |

The above components were mixed together and dissolved to prepare a black ink. A ball point pen (E type for thin characters) was filled with this ink to prepare a writing utensil.

Preparation of eraser:

| | |
|---|---|
| ethyleneurea-butyraldehyde resin (desensitizer) | 10 parts |
| ethanol (solvent) | 70 parts |
| dioxane (solvent) | 16 parts |
| octoxyphenyl salicylate (ultraviolet light absorber) | 4 parts |

The above components were mixed together and dissolved to prepare an eraser solution. an oily marking pen part (M-10) was filled with this solution to prepare an erasing utensil. Handwriting written in the above ink was rubbed a few times with this erasing utensil and was clearly erased. The erased trace was subjected to a light resistance test for 10 hours by using a fade meter. It was found that the erased handwriting did not reappear.

COMPARATIVE EXAMPLE 8

Preparation of eraser:

| | |
|---|---|
| ethyleneurea-butyraldehyde resin | 10 parts |
| ethanol | 70 parts |
| dioxane | 20 parts |

An eraser solution having the above composition was prepared in a similar manner to that of Example 17 except that the ultraviolet light absorber was omitted from the eraser composition of Example 17. A marking pen type erasing utensil was prepared.

Handwriting written in the black ink prepared in Example 17 was rubbed with this erasing utensil and was clearly erased. This erased trace was subjected to a light resistance test in a similar manner to that of Example 17. It was found that the handwriting reappeared with a pale yellow color.

EXAMPLE 18

Preparation of eraser:

| | |
|---|---|
| N—vinylpyrrolidone/vinyl acetate copolymer (3:7) (desensitizer) | 10 parts |
| ethanol (solvent) | 80 parts |
| methyl isobutyl ketone (solvent) | 8 parts |
| 2-(2'-hydroxy-5'-methylphenyl)benzo-triazole (ultraviolet light absorber) | 2 parts |

The above components were mixed together and dissolved to prepare an eraser solution. An oily marking pen part (M-10) was filled with this eraser solution to prepare an erasing utensil. Handwriting written in the black ink prepared in Example 17 was rubbed with this erasing utensil. The handwriting was clearly erased. The erased trace was subjected to a light resistance test in a similar manner to that of Example 17. It was found that the erased handwriting did not reappear.

COMPARATIVE EXAMPLE 9

Preparation of eraser:

| | |
|---|---|
| N—vinylpyrrolidone/vinyl acetate copolymer (3:7) | 10 parts |
| ethanol | 80 parts |
| methyl isobutyl ketone | 10 parts. |

An eraser solution having the above composition was prepared in a similar manner to that of Example 18 except that the ultraviolet light absorber was omitted from the eraser composition of Example 18. A marking pen type erasing utensil was prepared.

Handwriting written in black ink prepared in Example 17 was rubbed with this erasing utensil. The handwriting was clearly erased. The erased trace was subjected to a light resistance test in a similar manner to that of Example 17. It was found that the erased handwriting reappeared with a pale yellow color.

EXAMPLE 19

Preparation of ink:

| | |
|---|---|
| Novolak type phenolic resin (TAMANOL #510) (developer) | 25 parts |
| Novolak type phenolic resin (p-cresol/formalin precondensate) | 10 parts |
| Crystal Violet Lacton (colorless dye) | 20 parts |
| phenyl glycol (solvent) | 20 parts |
| benzyl alcohol (solvent) | 25 parts |

The above components were mixed together, and dissolved to prepare a blue ink. A ball point pen (E type for medium characters) was filled with this ink to prepare a writing utensil.

Preparation of eraser:

| | |
|---|---|
| N—vinylpyrrolidone/vinyl acetate copolymer (3:7) (desensitizer) | 10 parts |
| ethanol (solvent) | 80 parts |
| dioxane (solvent) | 8 parts |
| high-molecular polyvinylpyrrolidone (average molecular weight of 360,000) (viscosity modifier) | 1.5 parts |
| coumarin fluorescent brightener (WHITEFLUOR B, a product of Sumitomo Kagaku K.K.) | 0.01 parts |
| naphthalimide fluorescent brightener (MIKAWHITE ACR conc., a product of Nippon Kayaku K.K.) | 0.5 parts |

The above components were mixed together and dissolved to prepare an eraser solution. An oily marking pen part (M-10) was filled with this solution to prepare an erasing utensil. Handwriting written in the above blue ink was rubbed a few times with this erasing utensil. The handwriting was clearly erased. The erased trace was as white as the paper and not noticeable. Rewriting was attempted on the erased surface with the same blue ink ball point pen 60 seconds after erasing. Clear handwriting was obtained. The erased trace and the rewritten trace were copied under conditions of speed rating ranging from 4 to 7 by using a diazo type copying apparatus (Recopy Superdry Model 455, a product of Ricoh Co., Ltd.). The erased trace and the rewritten trace were completely unnoticeable.

COMPARATIVE EXAMPLE 10

An ink eraser was prepared in a similar manner to that of Example 19 except that the fluorescent brightener was omitted. A marking pen type erasing utensil was prepared. Handwriting written on paper with the blue ink ball point pen prepared in Example 19 was rubbed with this erasing utensil. The handwriting was erased, but a spot such as an oil spot was slightly found on the erased trace. Rewriting was attempted on the erased trace with the same blue ink ball point ink 60 seconds after erasing. Clear handwriting was obtained. The erased trace and the rewritten trace were copied under conditions of speed rating ranging from 4 to 7 by using the same diazo type copying apparatus as that of Example 19. The erased trace and the rewritten trace were not noticeable at a speed rating ranging from 4 to 5.5, but the erased trace was observed with a whitish color at a speed rating ranging from 6 to 7.

EXAMPLE 20

Preparation of eraser:

| | |
|---|---|
| ethyleneurea-butyraldehyde resin (desensitizer) | 10 parts |
| ethanol (solvent) | 70 parts |
| dioxane (solvent) | 18 parts |
| high-molecular polyvinylpyrrolidone (average molecular weight of 360,000) (viscosity modifier) | 1.5 parts |
| fluorescent coumarin brightener (Kaycoll E, a product of Nisso Koko K.K.) | 0.05 parts |

The above components were mixed together and dissolved to prepare an eraser solution. An oily marking pen part (M-10) was filled with this solution to prepare an erasing utensil. Handwriting written on a filing paper (ivory-colored) with the blue ink ball point pen prepared in Example 19 was rubbed with this erasing utensil. Handwriting was completely erased. Gloss on the surface of the paper around the erased trace was substantially unchanged and not noticeable.

COMPARATIVE EXAMPLE 11

An ink eraser was prepared in a similar manner to that of Example 20 except that the fluorescent brightener was omitted. A marking pen type erasing utensil was prepared. Handwriting written on a filing paper (ivory-colored) with the blue ink ball point pen prepared in Example 19 was rubbed with this erasing utensil. The handwriting was completely erased, but gloss on the surface of the paper around the erased trace was changed and the ivory color was somewhat accentuated. Thus, the erased trace was discriminated from other parts of the paper.

What is claimed is:

1. A combination made of a writing utensil and an erasing utensil, said combination composed of a first barrel, an ink reservoir provided within said first barrel, an ink passage member for supplying ink from said ink reservoir to the tip of said first barrel and a writing nib provided at the tip of said ink passage member; said ink being stable colored ink being produced from the polar interaction between a developer having a phenolic hydroxyl group and an electron-donating colorless dye capable of developing a color by the action of said developer; and a solvent which does not inhibit a color developing reaction between said developer and said colorless dye; and said erasing utensil composed of a second barrel, an erasing solution reservoir provided within said second barrel, a porous passage member for supplying an erasing solution from said erasing solution reservoir to the tip of said second barrel and an erasing solution coating part which is formed by partly protruding said porous passage member from the tip of said second barrel; said eraser solution comprising a desensitizing polar compound which makes said colored ink colorless.

2. A combination of a writing utensil and erasing utensil as set forth in claim 1 wherein said writing utensil is a marking pen type writing utensil, said ink passage member consists of a felt or fibrous wick member, and said writing nib is formed by partly protruding said wick member from the tip of said first barrel.

3. A combination of a writing utensil and an erasing utensil as set forth in claim 1 wherein said writing utensil is a ball point pen type writing utensil, said ink passage member consists of a socket member provided with a through-hole, and said writing nib consists of a writing ball rotatably housed in and partly protruding from said socket member.

4. A combination of a writing utensil and an erasing utensil as set forth in claim 1 wherein said porous passage member of said erasing utensil consists of a felt, a fiber or a porous resin.

5. A combination of a writing utensil and an erasing utensil as set forth in claim 1 wherein said first barrel of said writing utensil and said second barrel of said erasing utensil consists of one barrel which is divided into two compartments by a divider, said ink reservoir being provided within one compartment of the barrel and said erasing solution reservoir being provided within the other compartment of the barrel.

6. A combination of a writing utensil and an erasing utensil as set forth in claim 1 wherein a detachable cap is provided at the side of the writing nib of said writing utensil in order to cover said writing nib, and a detachable cap is provided at the side of the erasing solution coating part of said erasing utensil in order to cover said coating part.

7. A combination of a writing utensil and an erasing utensil as set forth in claim 6 wherein said cap for covering said writing nib is provided with a spongy elastomer layer packed into the bottom part of said cap and with a synthetic resin film layer to cover the exposed surface of said elastomer layer, and said writing nib is retained such that said nib is enclosed through said film layer in said elastomer layer when said writing nib of the writing utensil is covered with said cap.

8. A combination of a writing utensil and an erasing utensil as set forth in claim 1 wherein said developer in said ink is a novolak type phenolic resin, and said solvent in said ink is selected from the group consisting of an aromatic alcohol, an ethylene glycol monophenyl ether and mixtures thereof.

9. A combination of a writing utensil and an erasing utensil as set forth in claim 1 wherein said ink contains further a metal salt of an aromatic carboxylic acid.

10. A combination of a writing utensil and an erasing utensil as set forth in claim 1 wherein said ink contains further a phosphite triester.

11. A combination of a writing utensil and an erasing utensil as set forth in claim 1 wherein said eraser is a liquid desensitizing polar compound.

12. A combination of a writing utensil and an erasing utensil as set forth in claim 1 wherein said eraser is a solution of a desensitizing polar compound dissolved in a solvent having a boiling point of 160° C. or lower, said desensitizing polar compound being a solid and having a melting point of 60° C. or higher and a vapor pressure of 1 mmHg or lower at 150° C.

13. A combination of a writing utensil and an erasing utensil as set forth in claim 12 wherein the viscosity of said eraser solution is adjusted within a range of from 10 to 200 cP at 25° C.

14. A combination of a writing utensil and erasing utensil as set forth in claim 13 wherein the viscosity solution is controlled by adding a high-molecular weight organic compound having thickening properties to said solution.

15. A combination of a writing utensil and erasing utensil as set forth in claim 13 wherein said eraser solution contains two or more said desensitizing compounds, at least one of which is a high-molecular weight desensitizing compound having thickening properties and the viscosity of said solution is controlled by the amount of said high-molecular desensitizing compound in the solution.

16. A combination of a writing utensil and erasing utensil as set forth in claim 12 wherein said eraser solution contains further an ultraviolet light absorber.

17. A combination of a writing utensil and erasing utensil as set forth in claim 12 wherein said eraser solution contains further a fluorescent brightener.

18. A combination of a writing utensil and an erasing utensil, said writing utensil composed of a barrel, an ink reservoir provided within said barrel, a passage member for supplying ink from said ink reservoir to the tip of said barrel and a writing nib provided at the tip of said passage member; said ink being a stable colored ink being produced from the polar interaction between a developer having a phenolic hydroxyl group, an electron-donating colorless dye capable of developing a color by the action of said developer; and a solvent which does not inhibit a color developing reaction between said developer and said colorless dye; said erasing utensil being a solid shaped article comprising a solidifying agent matrix and microcapsules uniformly dispersed in the matrix, said microcapsules enclosing therein, as a core material, an erasing solution comprising a desensitizing polar compound which makes said colored ink colorless.

19. A combination of a writing utensil and an erasing utensil as set forth in claim 18 wherein said solid erasing utensil is provided at an opposite end of the barrel with regard to the writing nib of said writing utensil.

20. A combination of a writing utensil and an erasing utensil as set forth in claim 18 wherein said developer in said ink is a novolak type phenolic resin, and said solvent in said ink is selected from the group consisting of an aromatic alcohol, an ethylene glycol monophenyl ether and mixtures thereof.

21. A combination of a writing utensil and an erasing utensil as set forth in claim 18 wherein said ink contains further a metal salt of an aromatic carboxylic acid.

22. A combination of a writing utensil and an erasing utensil as set forth in claim 18 wherein said ink contains further a phosphite triester.

* * * * *